June 8, 1965  K. J. CHICHESTER ETAL  3,187,891
DOCUMENT HANDLING APPARATUS
Filed April 9, 1963  4 Sheets-Sheet 1

KENNETH J. CHICHESTER
WILLIAM F. CLARKE
ALVORD C. PALMER
INVENTORS
BY
THEIR ATTORNEY

KENNETH J. CHICHESTER
WILLIAM F. CLARKE
ALVORD C. PALMER
INVENTORS

BY

THEIR ATTORNEY

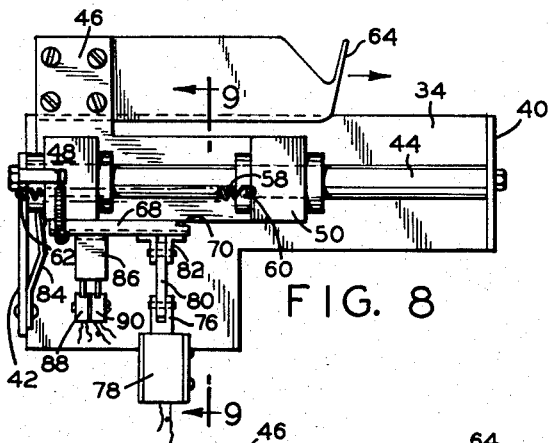
FIG. 8
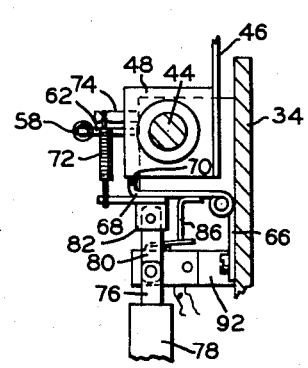
FIG. 9
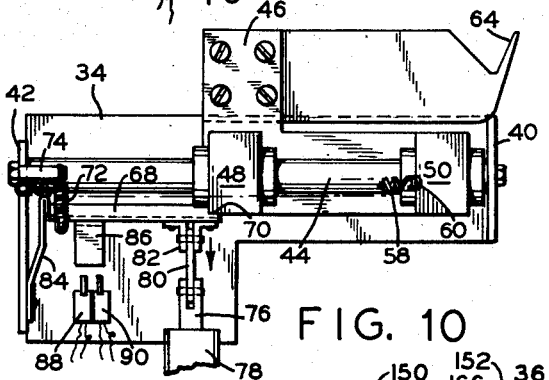
FIG. 10
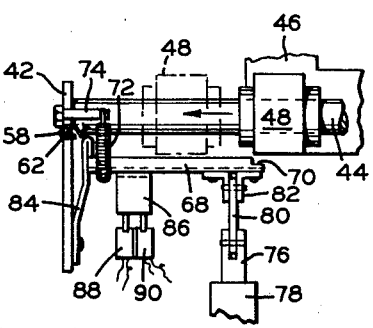
FIG. 11
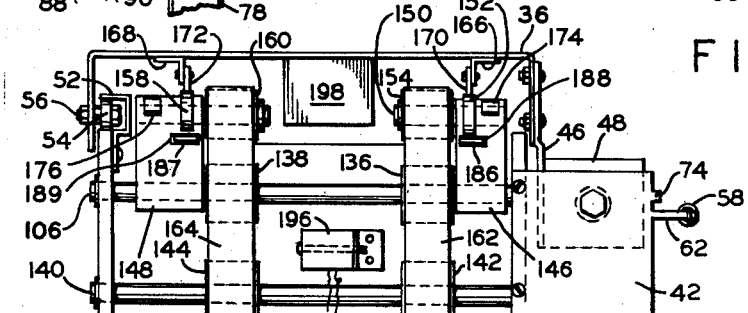
FIG. 12
KENNETH J. CHICHESTER
WILLIAM F. CLARKE
ALVORD C. PALMER
INVENTORS
BY 
THEIR ATTORNEY June 8, 1965  K. J. CHICHESTER ETAL  3,187,891
DOCUMENT HANDLING APPARATUS
Filed April 9, 1963  4 Sheets-Sheet 4

KENNETH J. CHICHESTER
WILLIAM F. CLARKE
ALVORD C. PALMER
INVENTORS

BY
THEIR ATTORNEY

3,187,891
DOCUMENT HANDLING APPARATUS
Kenneth J. Chichester, Stamford, Conn., William F.
Clarke, Larchmont, N.Y., and Alvord C. Palmer, Danbury, Conn., assignors to Universal Match Corporation, St. Louis, Mo., a corporation of Delaware
Filed Apr. 9, 1963, Ser. No. 271,739
10 Claims. (Cl. 209—73)

This invention relates generally to a document handling device and more particularly to a device for receiving, examining and storing documents.

This device finds particular utility in the vending machine industry wherein currency bills must be received from a purchaser and either change, e.g., coins or smaller denomination bills; merchandise; or a combination of merchandise and change must be delivered to the purchaser. The bill may be received by one machine and the merchandise/change may be delivered by the same or another machine.

Obviously, certain safeguards against fraudulent practices on the part of the depositor must be observed. These practices fall into two categories, viz: (1) the tender of an invalid bill, and (2) the removal of a valid bill after the examination thereof but before the storage of the bill.

It is customary to utilize two safeguards. The first safeguard is to provide the bill receiving device with a means to examine the document for validity. This examination may actually include two functions, viz: (1) to determine whether the bill is authentic, i.e. not counterfeit, and (2) to determine the denomination of the bill. The second safeguard is to provide means for preventing the depositor from interfering with the examination of the bill, and if the bill is found to be acceptable and the release of change/merchandise is authorized, from recapturing the bill and obtaining the change/merchandise also.

This invention provides an apparatus which is adapted to receive a bill from a depositor; to render the bill temporarily inaccessible to the depositor and to examine the bill for predetermined physical characteristics, such as may indicate validity or denomination; and to reject the bill and to render it accessible to the depositor, or to accept the bill and to render it permanently inaccessible to the depositor. The term "bill" as used herein includes currency, negotiable instruments, coupons, tokens and similar documents of value.

This apparatus is particularly useful in a device such as is shown in the U.S. Patent No. 3,072,237, granted to Luther G. Simjian on January 8, 1963, for "Currency Exchange Apparatus."

It is, therefore, an object of this invention to provide a document handling device which renders a document inaccessible to the depositor while its characteristics are being examined, and which, upon determining the document to be acceptable, maintains the document inaccessible to the depositor while transferring the document into storage where it is permanently inaccessible to surreptitious removal by the depositor.

Another object is to provide a document handling device which positively seizes the document during examination and transfer.

Another object is to provide a document handling device which does not authorize an exchange to the depositor for an accepted document until after the document has been transferred from the examining means.

Another object is to provide an improved means for examining documents.

A feature of this invention is a means for storing accepted documents, an enclosure for receiving a tendered document, means for positively seizing a document disposed in said enclosure and for providing an authenticity signal when the examined document is of a predetermined character; said seizing means uninterruptedly maintaining its seizure of the document and, in response to the authenticity signal, transferring the document from said enclosure to said storage means.

Another feature is the document examining means providing a reject signal when the examined document is not of a predetermined character; said seizing means, in response to the reject signal, releasing the document to the depositor.

Yet another feature is the provision of a document examining means utilizing a source and a receiver of radiant energy wherein the housing of the examining means both supports said source and said receiver and conducts the radiant energy from said source to the examined document and thence to said receiver.

Other and further objects and features of this invention will be more clearly apparent by reference to the following description when taken in conjunction with the accompanying drawings in which:

FIGURE 8 is a left side view of FIGURE 3, illustrating the hood latching means and showing the hood in its retracted position;

FIGURE 9 is a front view in section through FIGURE 8 taken along the line 9—9;

FIGURE 10 is a left side view of FIGURE 3, illustrating the hood latching means and showing the hood in its extended position;

FIGURE 11 is a detail of FIGURE 10 particularly showing the secondary latching means for the hood latching means;

FIGURE 12 is a rear view, partially in section, of the platform and hood of FIGURE 3;

Figures 1, 2:
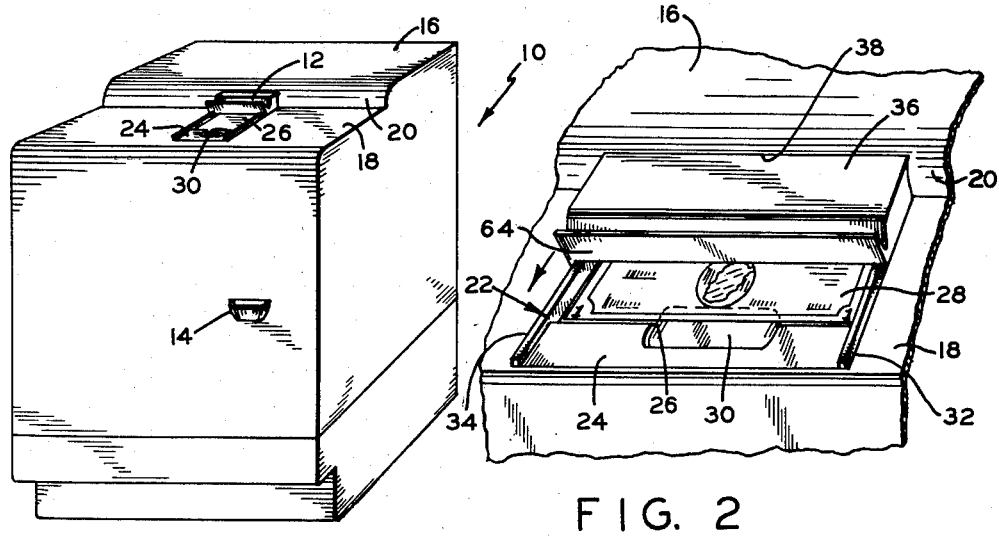
FIGURE 1 is a perspective view of the deposit receiving system.
FIGURE 2 is a fragmentary perspective view of FIGURE 1 showing a document inserted onto the document receiving platform with the verifier hood in its retracted position.

Referring to FIGURES 1 and 2, an embodiment of this invention is shown mounted in a cabinet 10 having a bill receiving means 12 disposed on its top and a change return cup 14 disposed at its front. The cabinet top is formed with two horizontal surfaces, a higher rear surface 16 and a lower front surface 18, both joined by a vertical surface 20. A platform 22 is fitted into the top front surface 18. The platform includes a higher front surface 24, and a lower rear surface 26 which is made with a width and depth which is adequate to receive a tendered bill 28. A recess 30 is formed in part in each surface to accommodate the depositor's fingers during the insertion or the removal of the bill from the rear surface 26. The platform is fixed between an outer right sideplate 32 and an outer left sideplate 34, an end of each of which projects above the cabinet top front surface 18. A hood 36 is disposed for sliding movement over the platform 22, through an opening 38, which is cut into the top vertical surface 20, and into the cabinet under the top rear surface 16. When the hood is in its retracted or rear position, as shown in FIGURE 2, most of the platform rear surface 26 is exposed and a bill may be deposited thereon. When the hood is in its extended or forward position the entire platform 22 is covered, and the extended hood and platform, in combination, form an enclosure about the deposited bill.

Figure 3:
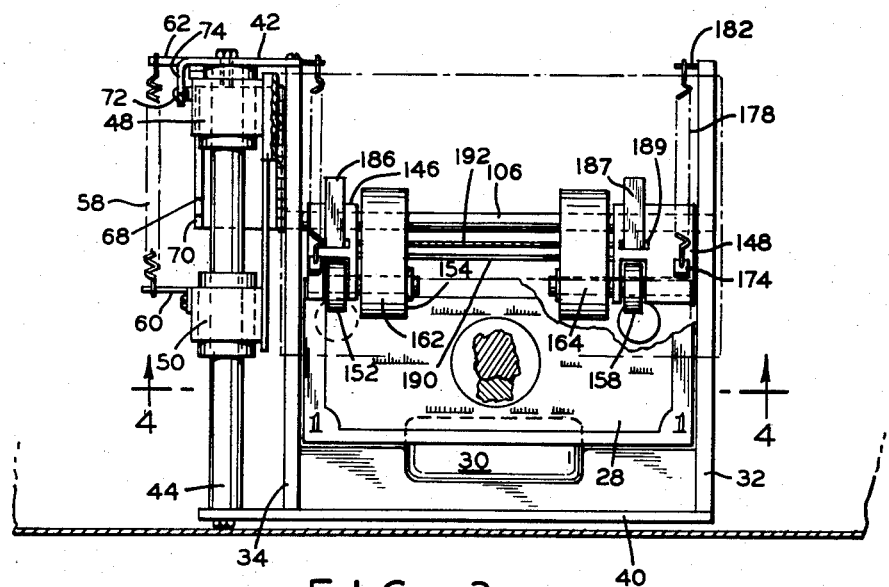
FIGURE 3 is a plan view of the document receiving platform of FIGURE 2 with portions of the verifier hood shown broken away.

A front plate 40, as shown in FIGURE 3, is fixed between the outer side plates 32 and 34, and extends to the left beyond the left side plate. A rear plate 42 is fixed to and extends to the left of the left side plate only. A rod 44 is fixed between the front and rear plates 40 and 42. An L-shaped extension plate 46 is fixed to the left side of the hood 36 and has fixed thereto a rear bearing 48 and a front bearing 50 which are journaled on the rod 44. A channel 52 is fixed to the outer right side plate 32. A roller 54 is mounted on a shaft 56 which is fixed to the right side of the hood 36. The roller is constrained between the upper edge of the upper right side plate 32 and the upper web of the channel 52. The bearings 48 and 50 and the roller 54 constrain the hood 36 for front to rear reciprocatory motion. A tension spring 58 is fixed to the front bearing 50 by a bracket 60, and to the rear plate 42 by a plate extension 62. The hood 36 is biased towards its rear or retracted position by the spring 58. A handle 64 is formed on the front surface of the hood to permit a depositor to pull the hood to its front or extended position.

As shown in FIGURES 8 through 11, a hinge type latch mechanism is provided to latch the hood in its extended position. The lower, vertical plate 66 of the latch is fixed to the outer left side plate 34 and pivotally supports the upper, horizontal plate 68. The upper plate is L shaped and has a notch 70 cut out in the front of the foot of the L which is adapted to interlock with the rear of the rear bearing 48 when the plate is in its up position, as shown in FIGURE 10. A tension spring 72 is fixed between an extension 74 of the rear plate 42 and a hole in the foot of the upper plate 68 to bias the upper plate upwardly.

A plunger 76 of a solenoid 78 is coupled by a link 80 to a bracket 82 which is fixed to the upper latch plate 68. When the solenoid is energized, the latch plate is pulled downwardly, disengaging the notch 70 from the rear bearing 48. A spring finger 84 is fixed at one end to the rear plate 42 and biased outwardly to engage its other end, which is bent over, with the lowered latch plate 68. Thus, when the solenoid lowers the upper latch plate 68, releasing the hood from its forward or extended position, the spring finger 84 latches the plates 68 in this lower or down position, as shown in FIGURE 11. When the hood returns to its rear or retracted position, the rear of the rear bearing 48 abuts the spring finger 84, disengaging it from the plate 68, and permitting the spring 72 to restore the plate 68 to its mid portion, as shown in FIGURE 8. A depending bracket 86 is also fixed to the plate 68. A pair of snap action switches 88 and 90 are fixed to a bracket 92 which is fixed to the outer left side plate 34. When the plate 68 is in its upper position the switches are unactuated. When the plate is in its lower and mid positions the bracket 86 actuates both switches.

Figure 4:
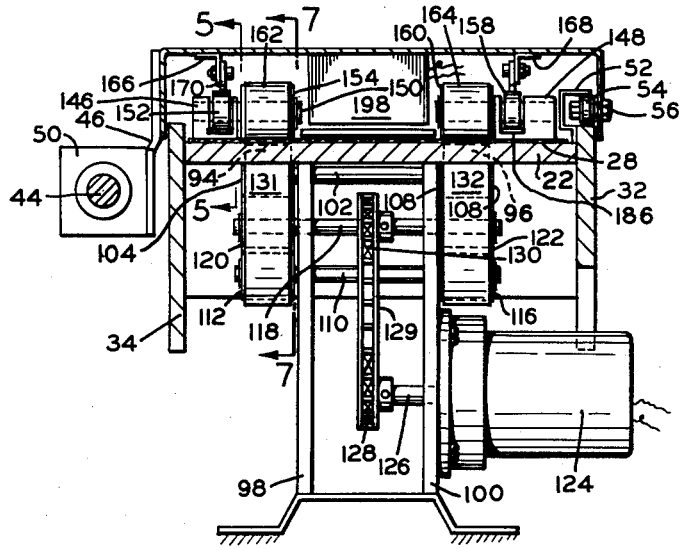
FIGURE 4 is a front view in section of the platform and the hood of FIGURE 3 taken along the line 4—4.
Figure 7:
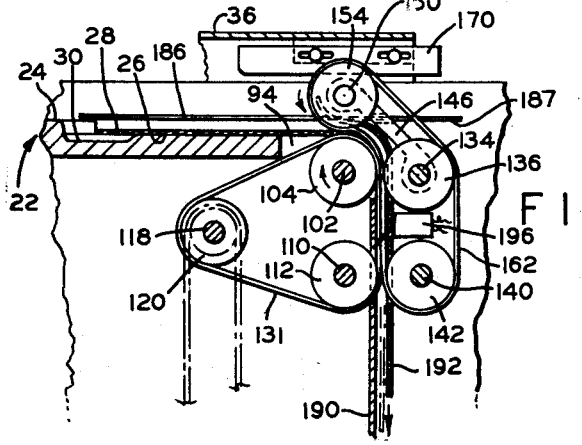
FIGURE 7 is a fragmentary side view of FIGURE 4, taken along the line 7—7, further illustrating the document seizing means.

A pair of cutouts 94 and 96 are provided in the rear edge of the platform 22, as shown in FIGURES 3 and 4. An inner left side plate 98 and an inner right side plate 100 are fixed below the platform 22 between the cutouts. A first shaft 102 is journalled below the platform 22 through the inner side plates 98 and 100 and carries thereon, beyond the plates, a pair of belt support rollers 104 and 108. The rollers 104 and 108 are respectively disposed in part in the cutouts 94 and 96. The peripheries of these rollers are substantially level with the top rear surface 26 of the platform 22, as shown in FIGURE 7. A second shaft 110 is journalled vertically below and parallel to the first shaft, through the inner side plates 98 and 100 and carries thereon, beyond the plates, a pair of belt support rollers 112 and 116. A third shaft 118 is journalled through the inner side plates 98 and 100, forward of and parallel to the first and second shafts, and carries thereon a pair of belt support rollers 120 and 122. A motor 124 is fixed to the inner right side plate 100 and rotates a drive shaft 126 which is journalled through the side plate 100. The drive shaft 126 has fixed thereto and rotates a sprocket wheel 128, which wheel is meshed with a chain 129, and which chain is also meshed with a sprocket wheel 130 which is fixed to and rotates the third shaft 118. A lower left belt 131 is supported around the rollers 104, 112 and 120, and a lower right belt 132 is supported around the rollers 108, 116 and 122. These belts, as they pass around the rollers 104 and 108, rise slightly above the top rear surface 26 of the platform 22.

A fourth shaft 134 is journalled to the outer side plates 32 and 34, rearward of and parallel to the first shaft 102, and carries thereon a pair of belt support rollers 136 and 138. The rollers 136 and 138 are opposite to the rollers 104 and 108 respectively, and spaced slightly away therefrom. A fifth shaft 140 is journalled to the outer side plates 32 and 34, rearward of and parallel to the second shaft 110 and carries thereon a pair of belt support rollers 142 and 144. The rollers 142 and 144 are opposite to the rollers 112 and 116 respectively, and spaced slightly away therefrom.

A pair of rocker arms 146 and 148 are journalled to the ends of the fourth shaft 134. The free end of each arm is bifurcated to receive therein a cam follower roller, and has a shaft journalled therethrough to support the follower and to carry a belt support roller. The arm 146 has journalled therein a sixth shaft 150 which carries a cam follower roller 152 and a belt support roller 154, and the arm 148 has journalled therein a seventh shaft 156 which carries a cam follower roller 158 and a belt support roller 160. An upper left belt 162 is supported around the rollers 154, 136 and 142, and is supported partially by the roller 104. An upper right belt 164 is supported around the rollers 160, 138 and 144, and is supported partially by the roller 108.

Figure 5:
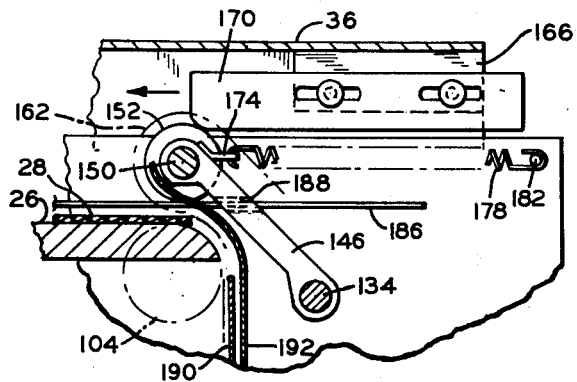
FIGURE 5 is a fragmentary side view of FIGURE 4, taken along the line 5—5, illustrating the hood camming a belt of the document seizing means to seize the document.
Figure 6:
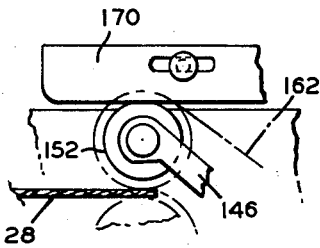
FIGURE 6 is a detail of FIGURE 5 further illustrating the hood camming a belt of the document seizing means.

The hood 36 has a pair of right angle brackets 166 and 68 fixed thereto. A pair of cam plates 170 and 172 are respectively fixed to the brackets by means of an adjustable slot and bolt fastening. When the hood is pulled forward, the cam plates are adapted to abut the cam follower rollers 152 and 158 with their rounded lower front corners, as shown in FIGURE 5, swinging the rollers, the rocker arms, and the belt supporting rollers 154 and 156 forwardly and downwardly, thereby abutting the upper belts and the lower belts. A bill 28 which has been inserted onto the lower rear surface 26 of the platform 22 will be pinched between and seized by the upper and lower belts. As the hood is pulled further forward, the lower edges of the cam plates ride onto the cam follower rollers, as shown in FIGURE 6, maintaining the seizure of the bill by the belts. A pair of brackets 174 and 176 are respectively fixed to the rocker arms 146 and 148, and a pair of tension springs 178 and 180 are respectively fixed between the brackets and a pair of pins 182 and 184, which in turn are respectively fixed to the side plates 34 and 32. Thus, when the hood is in its retracted position, the springs pull the rocker arms upwardly and rearwardly, providing a gap between the upper and the lower belts into which a bill will be disposed when it is inserted onto the rear surface 26; while when the hood is in its extended position, the upper belts are cammed downwardly to seize the bill between the upper and lower belts.

A pair of leaf spring arms 186 and 187 are fixed to the hood 36 and ride through apertures 188 and 189 respectively in the rocker arms 146 and 148 respectively. The forward portions of the arms serve to flatten a wrinkled or creased bill against the platform surface 26.

A pair of spaced apart guide plates 190 and 192 are disposed between the forward shafts 102, and 110 and the rearward shafts 134 and 140, and are fixed to the outer side plates 32 and 34. Four cutouts are provided in each plate, each to receive an adjacent belt guide roller. The upper and lower belts pass between the guide plates, as seen in FIGURE 7. The belts are pinched together by the rollers and serve to maintain the seizure of the bill when it is removed from the platform surface 26.

A switch 196 is fixed to the rear guide plate 192 and has an actuator arm 196MC which passes through the rear guide plate into the gap between the plates. As will be discussed in greater detail later, a bill which is disposed on the platform surface 26 and seized by the belts may be drawn by the belts from the surface and then between the guide plates 190 and 192, moving the arm 196MC and actuating the switch 196.

A receptacle 197, as shown in FIGURE 12, is disposed below the lower ends of the guide plates 190 and 192. When a bill is passed between the guide plates by the upper and lower belts, it actuates the switch 196 and subsequently is moved beyond the belts and falls into the receptacle.

A means 198, for examining a bill which is disposed on the platform surface 26, is shown in FIGURES 4 and 12. A suitable apparatus for this purpose is shown in U.S. Patent No. 2,941,187, granted to L. G. Simjian on June 14, 1960. In this patent, various means for examining the characteristics of a bill are shown. Simjian selects a plurality of pre-established discrete areas and measures the light absorption by these areas. The light is provided by a light source and is either reflected by, or transmitted through the bill to a light sensitive cell. A set of readings from one bill is compared with another set or a predetermined value to ascertain the acceptability of the bill. FIGURE 3 of this Simjian patent illustrates an embodiment utilizing reflected light.

The means 198 includes a block 200 of light transmitting material such as methyl methacrylate resin, which is fixed to the underside of the hood 36. When the hood is in its extended position, the block is disposed over the bill 28 on the platform surface 26.

Figure 13:
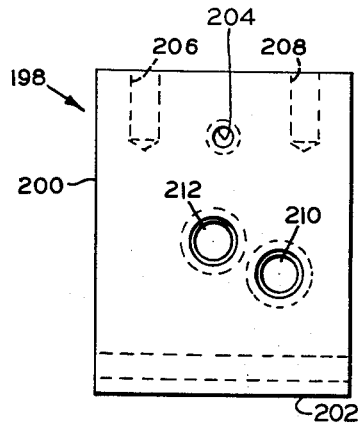
FIGURE 13 is a plan view of the housing of the examining means.
Figure 15:
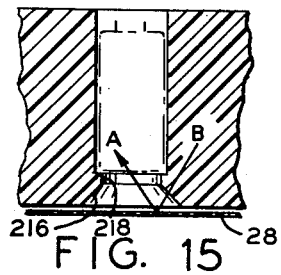
Figure 14:
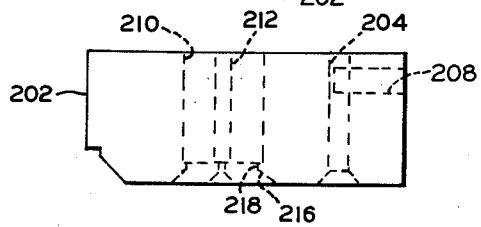
FIGURE 14 is a side view of the housing of FIGURE 13.

As seen in FIGURES 13, 14 and 15, the block 200 of resin includes a projecting end portion 202 which is adapted to be slidably received by an L-shaped bracket (not shown) fitted to the underside of the hood 36, and a vertical hole 204 which is adapted to receive a bolt (not shown) which engages suitable threaded means (not shown) in the hood, all to fix the block to the hood.

A pair of horizontal holes 206 and 208 are provided in the rear edge of the block. These holes are adapted to receive suitable light source means (not shown) such as light bulbs, of a diameter equal to the diameter of the holes, with their associated lead wires. The exterior surface of the block is coated with an under-coat of light reflective material and an outer coat of light opaque material, thereby providing internal reflection and dispersion of the light from the light sources throughout the interior of the block.

A pair of vertical holes 210 and 212 are provided through the block. These holes are adapted to receive suitable light sensitive means (not shown) such as cadmium sulphide photoelectric cells. The light sensitive means is only sensitive to light which enters the cell at its end, as is shown, for example, in FIGURE 15, by the arrow A. A 45 degree chamfered surface 216 is provided at the end of each of the holes 210 and 212 into the lower surface of the block which is adjacent the bill 28 which is being examined. A neck or constriction 218 may be located at the upper end of the chamfer to accurately locate the reading end of the photoelectric cell. The surfaces of these chamfers are not coated. Light from the interior of the block is transmitted through each of the chamfered surfaces, as shown by the arrow B in FIGURE 15, to a predetermined area of the bill 28 and reflected back to the photoelectric cell and measured. The light passing through each of the chamfered surfaces is substantially identical and the light received by each of the photoelectric cells will be a function of the reflectivity or, conversely, the absorption of each of the predetermined areas of the bill.

By this arrangement, a uniform and accurately located light source is provided for each photoelectric cell. The use of a single block for more than one photoelectric cell provides a standardized light source for each of the cells and avoids the necessity of standardizing the light output of a plurality of individual light sources. It is, however, practical to use a plurality of blocks, each having a single photoelectric cell and one or two light sources therein. The use of two light sources ensures a uniform distribution of light around the chamfered surface. It is also practical to place the light sources in vertical holes.

Although it is not shown, it is practical to provide several bill examining means above and below the bill to obtain as much data about the bill as possible. The bill examining means below the bill may be mounted in suitable holes through the platform.

Figure 16:
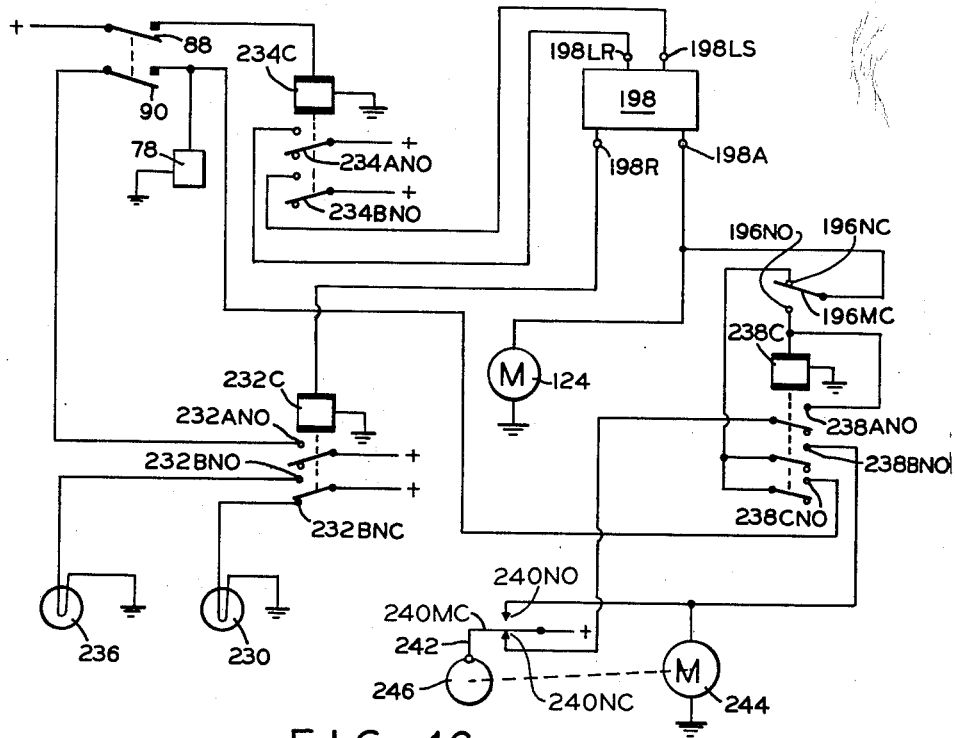
FIGURE 16 is a schematic circuit diagram of the controls for effecting the operation of this apparatus.

In operation, the hood 36 is normally in its retracted position, exposing most of the platform lower rear surface 26. As shown in FIGURE 16, a "Pull Forward" lamp 230 has one terminal coupled through the second set of normally closed contacts 232BNC of a reject relay coil 232C, to B+, and its other terminal connected to a ground return; and thus this lamp is illuminated. The depositor places a bill 28 upon the platform lower rear surface 26 and subsequently pulls the hood 36 forward. When the hood reaches its forward, extended position, the upper latch plate 68, biased by the spring 72, snaps behind the rear bearing 48 and locks the hood in its forward position. The bill is now fully enclosed by the hood and the platform, is positively seized between the upper and lower sets of belts 131, 132 and 162, 164, respectively, and is inaccessible to the depositor. Also, as the hood is moved into its forward position the bracket 86 is moved away from and deactuates the normally closed snap action switches 88 and 90. The switch 88 (and also the switch 90) closes and couples one terminal of a voltage control relay coil 234C to B+, the other terminal of the coil is connected to a ground return, and thus the relay operates. The relay's first and second moving contacts transfer, coupling B+ to the light source terminal 198LS and light receiver terminal 198LR of the bill examining means 198 via the normally open contacts 234ANO and 234BNO respectively.

If the bill is not acceptable, or if no bill has been inserted, the bill examining means applies B+ to its reject terminal 198R which is connected to one terminal of the coil 232C of the reject relay; the other coil terminal is connected to a ground return, and thus the relay operates. The relay's second moving contact transfers, coupling B+ via the normally open contact 232BNO to one terminal of a "Reject" lamp 236. The other terminal of the lamp is connected to a ground return, and thus the "Reject" lamp is illuminated. The reject relay's first moving contact also transfers, coupling, via the normally open contact 232ANO and the now closed switch 90, one terminal of the door latch solenoid 78 to B+. The other terminal of the solenoid is connected to a ground return, and thus the solenoid is energized, lowering the upper latch plate 68 and releasing the hood 36. The hood is restored to its rear, retracted position by the tension spring 58, exposing the rejected bill for removal by the depositor. The hood, when in its rear position, also causes the bracket 86 to actuate the switches 88 and 90, restoring the device to its ready condition.

If the bill is acceptable, the bill examining means 198 applies B+ to its accept terminal 198A, which is connected to one terminal of the belt drive motor 124. The other terminal of the motor is connected to a ground return, and thus the motor is energized. The motor drives the third shaft 118 which drives the lower belts 131 and 132. The lower belts drive the upper belts 162 and 164. When the hood was pulled forward the bill was seized by and between the upper and lower sets of belts, and these belts now draw the bill between them, through the guide plates 190 and 192, and then release the bill, which falls into the receptacle 197. As the bill is drawn by the belts through the guide plates it moves the actuator arm and moving contact 196MC of the switch 196, and couples the B+ at the accept terminal 198A of the bill examining means, via a normally open contact 196NO, to one terminal of a payout control relay coil 238C. The other terminal of this coil is connected to a ground return, and the relay is thus energized, transferring its three moving contacts. The first moving contact couples B+ via a now closed, normally open contact 238ANO, and a moving contact 240MC which is controlled by a cam follower 242 and a normally closed contact 240NC, to the first terminal of the relay coil 238C. Thus, the relay is maintained energized even though the switch 196 is deactuated after the passage of the bill. After the bill has passed, the switch 196 couples the B+ at the accept terminal 198A, via the normally closed contact 196NC to the new closed, second and the third moving contacts. The second moving contact thus couples B+ via its normally open contact 238BNO to one terminal of a payout drive motor 244. The other terminal of the motor is connected to a ground return, and thus the motor is energized, driving a suitable payout means (which is not shown) and a one-cycle dimple cam 246. The cam follower 242 rides out of the dimple, transferring the moving contact 242MC to the normally open contact 242NO, thus maintaining B+ on the payout motor 244 for one full cycle of the cam 246. The third moving contact couples B+ from the accept terminal 198A, via its normally open contact 238CNO to the first terminal of the door latch solenoid 78. The door latch solenoid is thus energized releasing the hood from its forward position for return to its retracted position, and restoring the device to its ready condition. The bill examining means 198 and the payout control relay 238C are de-energized. When the cam follower returns to the dimple, B+ is removed from the payout drive motor 244 and the payout device is also in its ready condition.

We have thus described and illustrated several embodiments of the invention. It will be understood by those skilled in the art that various further modifications and changes may be made therein without deviating from the principle and intent of the present invention which shall be limited only by the scope by the appended claims.

What is claimed is:

1. A document handling apparatus comprising:
  an enclosure;
  storage means disposed within said enclosure;
  said enclosure including a stationary platform, normally exposed, for acceptance of a document; and a hood, movable from a normally retracted position at which said platform is exposed to an extended position at which said hood covers said platform and a document disposed on said platform is enclosed between said platform and said hood and thereby disposed also within said enclosure;
  a path between said platform and said storage means;
  transfer means disposed in said path and in abutting relation with said platform for seizing, when actuated, a document on said platform and transferring it from said platform to said storage means;
  latching means for latching said hood in said extended position;
  examining means disposed for examining a document disposed on said platform and for providing a signal on establishing the existence of a predetermined characteristic of the document;
  and control means coupled to said examining means, said transfer means and said latching means for actuating said examining means when said hood is latched in said extended position and in response to the existence of said signal actuating said transfer means for transferring the document from said platform to said storage means and subsequently unlatching said hood from said extended position.

2. A document handling apparatus comprising:
  an enclosure;
  storage means disposed within said enclosure;
  said enclosure including a stationary platform, normally exposed, for acceptance of a document; and a hood, movable from a normally retracted position at which said platform is exposed to an extended position at which said hood covers said platform and a document disposed on said platform is enclosed between said platform and said hood and thereby disposed also within said enclosure;
  a path between said platform and said storage means;
  transfer means disposed in said path and in abutting relation with said platform for seizing, when actuated, a document on said platform and transferring it from said platform to said storage means;
  latching means for latching said hood in said extended position;
  examining means disposed for examining a document disposed on said platform and for providing a predetermined signal on establishing the existence of a predetermined characteristic of the document;
  and control means coupled to said examining means, said transfer means and said latching means for actuating said examining means when said hood is latched in said extended position and, in response to the existence of said signal, actuating said transfer means for transferring the document from said platform to said storage means and subsequently unlatching said hood from said extended position; and said control means, in response to the absence of said predetermined signal, omitting the actuation of said transfer means whereby, upon unlatching said hood, the document remains exposed on said platform in received condition for removal therefrom.

3. A document handling apparatus comprising:
  a cabinet enclosure:
  storage means disposed within said cabinet enclosure;
  said enclosure including a stationary platform, normally exposed, for acceptance of a document; and a hood, movable from a normally retracted position at which said platform is exposed to an extended position at which said hood covers said platform and a document disposed on said platform is enclosed between said platform and said hood;
  a path between said platform and said storage means;
  transfer means disposed in said path and in abutting relation with said platform for transferring a document from said platform to said storage means;
  said transfer means including opposed seizure means for positively seizing a document at said platform and for transferring, when actuated, the document from its position on said platform to said storage means while maintaining seizure as the document is removed from said platform;

coupling means coacting between said seizure means and said hood for causing, when said hood is in its retracted position, said seizure means to have a gap at said platform for receiving the leading edge of a document disposed on said platform; and for causing the closing of said gap when said hood is moved to its extended position whereby the document is seized by said seizure means;

examining means disposed for examining a document disposed on said platform and for providing a signal on establishing the existence of a predetermined characteristic of the document;

and control means coupled to said examining means and said transfer means for actuating said seizure means to cause the removal of a document from said platform and transfer thereof to said storage means in response to the existence of said signal.

4. A document handling apparatus comprising:

a cabinet enclosure:

storage means disposed within said cabinet enclosure;

said enclosure including a stationary platform, normally exposed, for acceptance of a document; and a hood, movable from a normally retracted position at which said platform is exposed to an extended position at which said hood covers said platform and a document disposed on said platform is enclosed between said platform and said hood;

a path between said platform and said storage means;

transfer means disposed in said path and in abutting relation with said platform for transferring a document from said platform to said storage means;

said transfer means including opposed seizure means for positively seizing a document at said platform and for transferring, when actuated, the document from its position on said platform to said storage means while maintaining seizure as the document is removed from said platform;

coupling means coacting between said seizure means and said hood for causing, when said hood is in its retracted position, said seizure means to have a gap at said platform for receiving therein the leading edge of a document disposed on said platform; and for causing the closing of said gap when said hood is moved to its extended position whereby the document is seized by said seizure means;

latching means for latching said hood in said extended position;

examining means disposed for examining a document disposed on said platform and for providing a first signal on establishing the existence of a predetermined characteristic of the document and for providing a second signal on establishing the absence of said predetermined characteristic;

and control means coupled to said examining means, said seizure means and said latching means for actuating said examining means when said hood is latched in said extended position and in response to the existence of said first signal actuating said transfer means for transferring the document from said platform to said storage means and subsequently unlatching said hood from said extended position, and in response to the existence of said second signal omitting the actuation of said transfer means whereby to leave the document disposed on said platform.

5. A document handling apparatus as set forth in claim 4 wherein said seizure means comprises a pair of opposed belts, one belt for contacting the topside of a document on said platform and the other belt for contacting the underside of the document;

one of said belts abutting said platform being mounted about a roller having a movable axis of rotation;

and said coupling means coating between said seizure means and said hood comprising a linkage for shifting said axis relative to said platform, whereby to provide said gap when said hood is in said retracted position and to cause closing of said gap when said hood is in said extended position.

6. A document handling apparatus as set forth in claim 5 and including bias means which urges said roller having a movable axis of rotation in a direction to produce said gap.

7. A document handling apparatus comprising:

a cabinet enclosure;

storage means disposed within said cabinet enclosure;

said enclosure including a stationary platform, normally exposed for receiving and supporting thereon in received position a document during subsequent examination;

a hood mounted to said enclosure and movable from a normally retracted position at which said platform is exposed for receiving a document to an extended position at which said hood covers said platform and a document disposed on said platform is enclosed between said platform and said hood;

resilient bias means for biasing said hood toward its retracted position;

a bent path between said platform and said storage means;

transfer means disposed in said path and in abutting relation with said platform for transferring, when actuated, a document from said platform through said bend to said storage means;

said transfer means comprising a pair of opposed endless belts, one belt for contacting the topside of a document on said platform and the other belt for contacting the underside of the document;

one of said belts abutting said platform mounted for rotation about a roller which is mounted for rocking motion relative to said platform;

linkage means coacting between said hood and said roller mounted for rocking motion for causing said belts to provide a gap at said platform when said hood is in said retracted position whereby to cause the leading edge of the document on said platform to lie in said gap, and for closing said gap when said hood is moved to said extended position whereby the document is seized between said belts;

latching means for latching said hood in said extended position;

examining means disposed for examining a document disposed on said platform for providing a first signal on establishing the presence of a predetermined characteristic of the document and for providing a second signal on establishing the absence of said predetermined characteristic;

sensing means disposed in said path to determine the passage of the entire document from said platform;

and control means coupled to said examining means, said transfer means, said sensing means and said latching means for actuating said examining means when said hood is latched in said extended position and, in response to the existence of said first signal, actuating said transfer means for transferring the document from said platform to said storage means and, in response to said sensing means sensing the passage of the document from said platform, actuating said latching means to unlatch said hood whereby to cause said bias means to return said hood to its retracted position;

and said control means, in response to the existence of said second signal, omitting the actuation of said transfer means and actuating said latching means to unlatch said hood whereby to cause said bias means to return said hood to its retracted position, leaving the document disposed on said platform.

8. A document handling apparatus as set forth in claim 7 wherein said examining means comprises light responsive means.

9. A document handling apparatus as set forth in claim 7 wherein said examining means is mounted to said hood.

10. A document handling apparatus as set forth in claim 7 wherein said bent path includes a bend of substantially ninety degrees.

References Cited by the Examiner

UNITED STATES PATENTS

| | | |
|---|---|---|
| 2,838,683 | 6/58 | Munro. |
| 2,922,893 | 1/60 | Ett. |
| 2,951,164 | 8/60 | Timms. |
| 2,995,976 | 8/61 | Weingart. |
| 3,108,693 | 10/63 | Patzer _____ 209—111.5 |

ROBERT B. REEVES, *Acting Primary Examiner.*